United States Patent
Sato et al.

(10) Patent No.: US 9,851,709 B2
(45) Date of Patent: Dec. 26, 2017

(54) NUMERICAL CONTROL DEVICE

(71) Applicant: Mitsubishi Electric Corporation, Tokyo (JP)

(72) Inventors: Tomonori Sato, Tokyo (JP); Kenji Nishiwaki, Tokyo (JP); Susumu Hamamoto, Tokyo (JP); Masaki Ryu, Tokyo (JP); Yukihiro Iuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 79 days.

(21) Appl. No.: 14/890,197

(22) PCT Filed: May 14, 2013

(86) PCT No.: PCT/JP2013/003064
§ 371 (c)(1),
(2) Date: Nov. 10, 2015

(87) PCT Pub. No.: WO2014/184820
PCT Pub. Date: Nov. 20, 2014

(65) Prior Publication Data
US 2016/0091886 A1 Mar. 31, 2016

(51) Int. Cl.
*G05B 19/19* (2006.01)
*G05B 19/416* (2006.01)

(52) U.S. Cl.
CPC ........... *G05B 19/19* (2013.01); *G05B 19/416* (2013.01); *G05B 2219/42064* (2013.01)

(58) Field of Classification Search
None
See application file for complete search history.

(56) References Cited

U.S. PATENT DOCUMENTS 5,475,602 A   12/1995   Otsuki et al.
6,225,772 B1 *  5/2001   Aizawa ............... G05B 19/416
                                                          318/571

(Continued)

FOREIGN PATENT DOCUMENTS

DE   10 2010 064 308 A1   8/2011
JP   S 6427838 A           1/1989

(Continued)

OTHER PUBLICATIONS

Search Report (PCT/ISA/210) dated Aug. 20, 2013, issued by the International Searching Authority in counterpart International Application No. PCT/JP2013/003064.

(Continued)

*Primary Examiner* — Paul Yanchus, III
(74) *Attorney, Agent, or Firm* — Sughrue Mion, PLLC

(57) ABSTRACT

In a numerical control device 1 which controls positions of respective axes of a machine tool according to a machining program 11, a command 12 instructed to the machining program 11 is analyzed by an analyzing unit 13, thereby obtaining movement data 15 and a movement type 17, an acceleration-deceleration data selection unit 18 selects acceleration-deceleration data 19 according to the movement type 17, and an interpolation and acceleration-deceleration unit 16 generates a position command 21 by performing an interpolation on a movement route, which is instructed to the movement data 15, according to a command speed and performing acceleration-deceleration according to the acceleration-deceleration data 19.

3 Claims, 8 Drawing Sheets

(56) References Cited

U.S. PATENT DOCUMENTS

2007/0213866 A1* 9/2007 Maki .................... G05B 19/406
                                                    700/188
2011/0190925 A1   8/2011 Fujishima et al.

FOREIGN PATENT DOCUMENTS

| JP | H 247702 A    | 2/1990  |
| JP | H 6131029 A   | 5/1994  |
| JP | H 8202426 A   | 8/1996  |
| JP | 2000311010 A  | 11/2000 |
| JP | 2003280712 A  | 10/2003 |
| JP | 200846899 A   | 2/2008  |
| JP | 2011158982 A  | 8/2011  |
| WO | 2013018338 A1 | 2/2013  |

OTHER PUBLICATIONS

Office Action dated Feb. 7, 2014, issued by the Japanese Intellectual Property Office in counterpart Japanese Application No. 2013-546495.

Communication issued by the German Patent and Trade Mark Office on Sep. 1, 2017 in counterpart German Patent Application No. 11 2013 006 980.6.

* cited by examiner

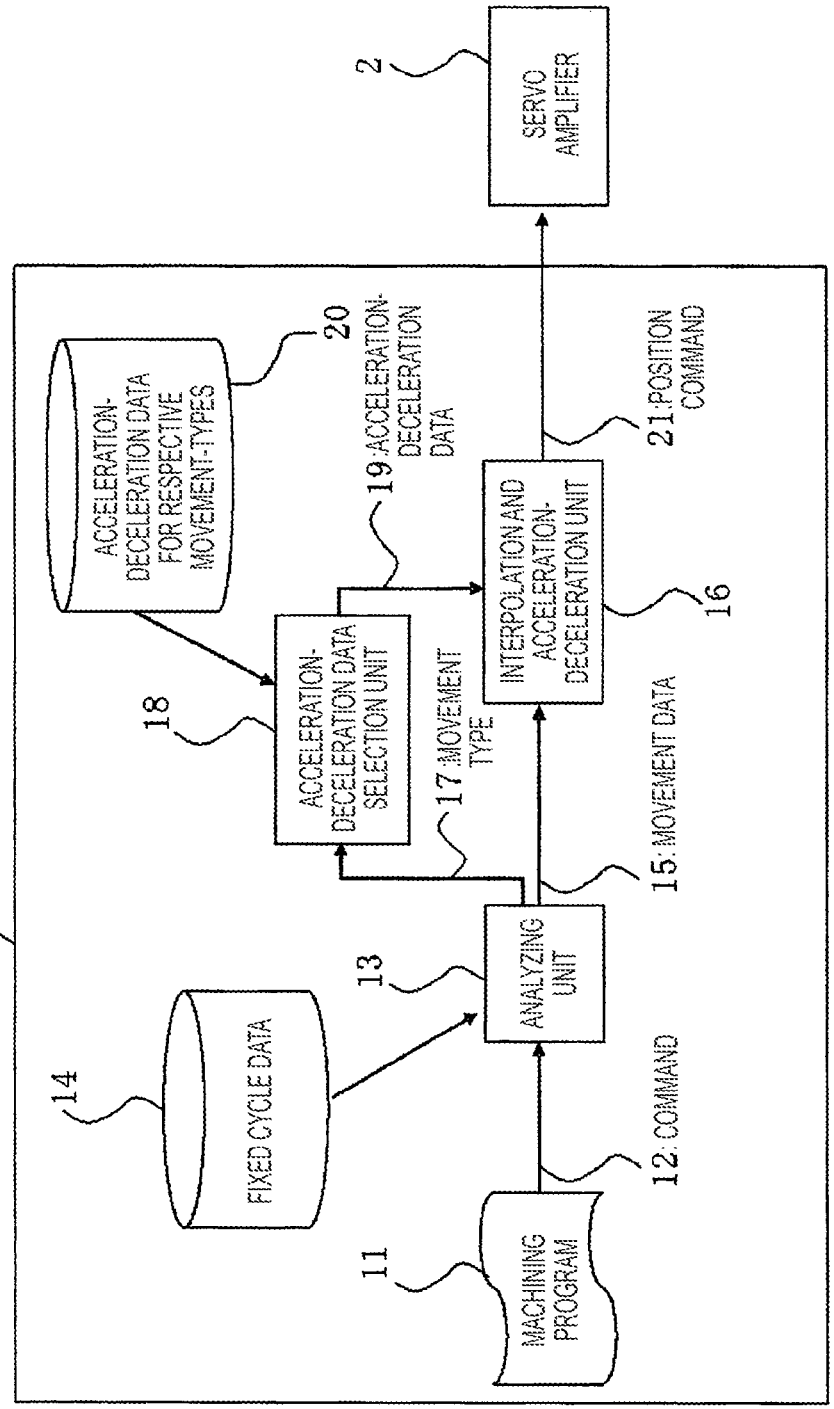

FIG. 2

| MOVEMENT TYPE | ACCELERATION-DECELERATION METHOD | | ACCELERATION-DECELERATION PATTERN | ACCELERATION-DECELERATION PARAMETER | | |
|---|---|---|---|---|---|---|
| | | | | TIME CONSTANT | INCLINATION ANGLE | IN-POSITION WIDTH |
| USUAL | USED TOGETHER | PRE-INTERPOLATION ACCELERATION-DECELERATION (CONSTANT INCLINATION ANGLE TYPE) | LINEAR | - | 0.2 | 0.01 |
| | | PRE-INTERPOLATION ACCELERATION-DECELERATION (CONSTANT TIME-CONSTANT TYPE) | LINEAR | 20 | - | |
| DRILL MACHINING CYCLE | USED TOGETHER | POST-INTERPOLATION ACCELERATION-DECELERATION (CONSTANT INCLINATION ANGLE TYPE) | LINEAR | - | 0.3 | 0.02 |
| | | POST-INTERPOLATION ACCELERATION-DECELERATION (CONSTANT TIME-CONSTANT TYPE) | LINEAR | 10 | - | |
| TURNING MACHINING CYCLE | | POST-INTERPOLATION ACCELERATION-DECELERATION (CONSTANT TIME-CONSTANT TYPE) | S CHARACTER | 90 | - | 0.015 |
| MILL MACHINING CYCLE | ALL USED TOGETHER | PRE-INTERPOLATION ACCELERATION-DECELERATION (CONSTANT INCLINATION ANGLE TYPE) | LINEAR | - | 0.1 | 0.01 |
| | | PRE-INTERPOLATION ACCELERATION-DECELERATION (CONSTANT TIME-CONSTANT TYPE) | S-SHAPED | 50 | - | |
| | | POST-INTERPOLATION ACCELERATION-DECELERATION (CONSTANT TIME-CONSTANT TYPE) | LINEAR | 24 | - | |

NUMERICAL CONTROL DEVICE

TECHNICAL FIELD

The present invention relates to a numerical control device for controlling operations of a machine tool, and in particular to a numerical control device which performs an acceleration-deceleration control in a particular machining operation instructed by a fixed cycle or the like.

BACKGROUND ART

In conventional numerical control devices, a desired machining is realized by combining machining processes accompanying a plurality of movements of a tool. For example, in a case of performing a machining of forming many holes, the machining is performed by combining a positioning process on an X-Y plane, a boring process of lowering along a Z axis, a process of restoring (retracting) to the positioning plane by rising along the Z axis, and so on. In practice, positioning accuracy required in the respective processes differ. However, usually, since an in-position width is the same in each of the processes, the in-position width is unified to an in-position width of a process in which a high positioning accuracy is required. As a result, this positioning requires much time and hence results in a cause of elongating a machining time.

Methods for solving such problem have been proposed. For example, a high-speed boring method is disclosed in patent document 1. According to the method of the patent document 1, a machining time is intended to be shortened by providing an in-position width at the bottom of a hole, and an in-position width for positioning and an in-position width for retracting set so as to have a value larger than the in-position width at the bottom of a hole.

PRIOR ART DOCUMENT

Patent Document

Patent Document 1: JP-A-H01-27838 (pages 3 to 4, FIG. 1)

SUMMARY OF THE INVENTION

Problem that the Invention is to Solve

However, although the aforesaid technique discloses a method of shortening the positioning time by considering the in-position widths, acceleration-deceleration methods are not considered. Thus, in an NC machine tool capable of performing various machining as well as a hole machining, there remains a problem that waste is produced in a particular machining. This problem will be explained hereinafter.

In conventional numerical control devices, a movement of a tool with respect to a work is described in a machining program by using commands for a linear interpolation or a circular interpolation and so on, and a position command of the tool at every moment is generated according to the machining program. The position command is sent to servo amplifiers of respective axes or an amplifier of a main axis to drive motors of the respective axes, whereby a machine tool is operated and a desired machining is performed. At this time, when generating the position command, in general, an acceleration-deceleration processing is performed so as to smoothen a time waveform thereof. This is because a torque or output of each of the motors may exceed a capable output value if a command speed or a command acceleration becomes high. As another reason, if a position command changing abruptly is applied, mechanical vibration may be generated or a servo system may not be able to follow up and hence a locus error may occur.

Various types of methods have been known as an acceleration-deceleration method. In each of these methods, in general, a degree of acceleration-deceleration can be adjusted according to parameters such as an acceleration-deceleration time constant. In an NC machine tool, a user can perform various machining by describing necessary commands as machining program. Thus, with respect to any machining operation capable of being performed by the machine tool, an acceleration-deceleration method and parameters relating to acceleration-deceleration according to this method are usually adjusted and set so as not to exceed the upper limit of a torque or output of each motor, so as not to generate mechanical vibration, and further, so as to attain mechanical accuracy normally required.

However, although the adjustment and setting of the acceleration-deceleration parameters described above can be used in various machining in an all-around manner, waste may be produced in a particular machining. For example, in a machining center, both of a contour machining of a metal mold or the like and a drill machining such as a boring are performed. In order to be able to also perform the contour machining, acceleration-deceleration is usually performed according to pre-interpolation acceleration-deceleration, and in general, a setting is performed by focusing on low vibration and high accuracy. In this case, there arises a problem that a machining time for a hole machining becomes unnecessarily long.

The invention is performed in view of the aforesaid circumstances and an object of the invention is to provide a numerical control device which can perform an acceleration-deceleration control of a particular machining operation based on an acceleration-deceleration method in a particular machining operation instructed by a fixed cycle or the like and acceleration-deceleration parameters thereof, which differ from a usual acceleration-deceleration method and acceleration-deceleration parameters thereof.

Means for Solving the Problems

According to a numerical control device of the invention, there is provided a numerical control device which controls positions of respective axes of a machine tool according to a machining program, the numerical control device including: an analyzing unit which obtains movement data and a movement type by analyzing a command instructed to the machining program; an acceleration-deceleration data selection unit which selects acceleration-deceleration data according to the movement type; and an interpolation and acceleration-deceleration unit which generates a position command by performing interpolation on a movement route, which is instructed to the movement data, according to a command speed and performing acceleration-deceleration according to the acceleration-deceleration data, wherein the acceleration-deceleration data according to the movement type is selected, and the acceleration-deceleration is performed according to the selected acceleration-deceleration data.

Advantage of the Invention

According to this invention, acceleration-deceleration data is selected for each movement type and acceleration-deceleration is performed based on the selected acceleration-deceleration data. Thus, shortening of a machining time and improvement of accuracy of a particular machining operation instructed by a fixed cycle or the like can be realized advantageously, without influencing on accuracy and on the like of a usual machining.

BRIEF DESCRIPTION OF THE DRAWINGS

FIG. 1 is a configuration diagram of a numerical control device according to an embodiment 1 of the invention.

FIG. 2 is a table showing an example of acceleration-deceleration data for each movement type according to the embodiment 1 of the invention.

EMBODIMENTS FOR CARRYING OUT THE INVENTION

Figure 3:
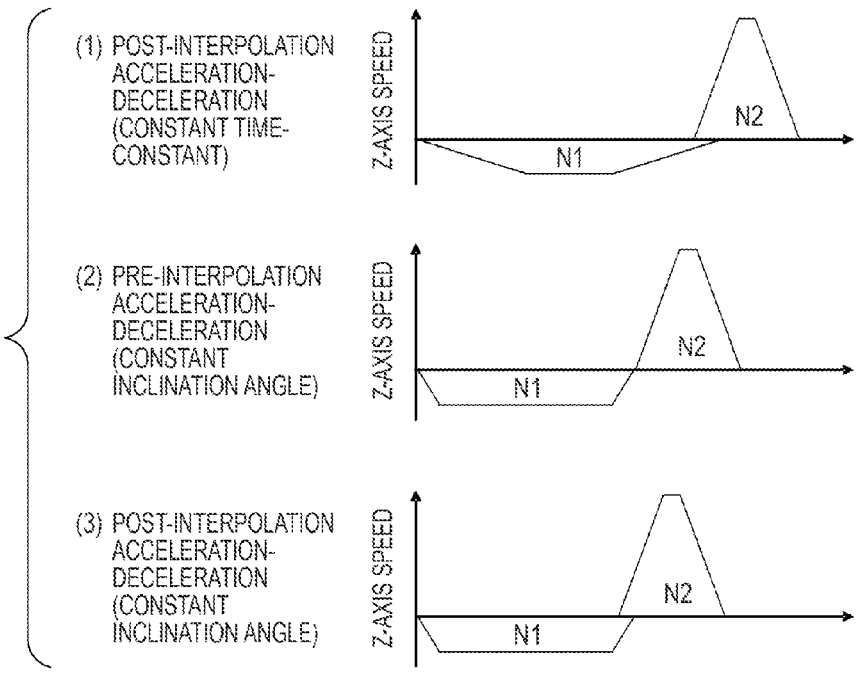
FIG. 3 is a diagram showing speed waveforms in a case of movements of two blocks according to the embodiment 1 of the invention.

Hereinafter, embodiments of a numerical control device according to the invention will be explained in detail based on drawings. Incidentally, the invention is not limited to the embodiments.

Embodiment 1

FIG. 1 is a configuration diagram for explaining the embodiment 1 according to the invention. In the drawing, 1 depicts a numerical control device. 11 depicts machining program, 12 depicts instructions (commands) such as G codes described in the machining program, 13 depicts an analyzing unit, 14 depicts fixed cycle data, 15 depicts movement data 16 depicts an interpolation and acceleration-deceleration unit, 17 depicts a movement type, 18 depicts an acceleration-deceleration data selection unit, 19 depicts acceleration-deceleration data, 20 depicts acceleration-deceleration data for respective movement-types and 21 depicts a position command. The movement data 15 is data defining a movement and is configured of a tool route, a movement speed, a stop time (dwell time), and so on. Interpolation and acceleration-deceleration is performed based on the movement data. The movement type 17 typically represents a type for each fixed cycle for each fixed cycle group.

The acceleration-deceleration data 19 is configured of a type of acceleration-deceleration: pre-interpolation acceleration-deceleration (constant inclination angle type), pre-interpolation acceleration-deceleration (constant time-constant type), post-interpolation acceleration-deceleration (constant time-constant type), post-interpolation acceleration-deceleration (constant inclination angle type) and so on, an acceleration-deceleration pattern: linear acceleration-deceleration, S-shaped acceleration-deceleration, index acceleration-deceleration and so on, and an acceleration-deceleration parameter: time constant, inclination angle (tangential acceleration), normal acceleration, locus error (tolerance), in-position width and so on.

In FIG. 1, in the numerical control device 1, the analyzing unit 13 sequentially analyzes the command 12 described in the machining program 11 and generates the movement data 15. The machining program 11 is stored in a not-shown memory or s supplied from the outside. When the command 12 of a fixed cycle is contained in the machining program 11, the analyzing unit 13 reads the fixed cycle data 14 and generates actual movement data 15. The fixed cycle data 14 is configured by describing a typical machining operation such as a hole machining by a general describing method (macro text or the like). Further, the analyzing unit 13 generates the movement type 17 according to the command 12 (in particular, fixed cycle command). The acceleration-deceleration data selection unit 18 reads the acceleration-deceleration data 19 corresponding to the movement type 17 from the acceleration-deceleration data 20 for respective movement-types and inputs the acceleration-deceleration data 19 into the interpolation and acceleration-deceleration unit 16. The interpolation and acceleration-deceleration unit 16 performs an interpolation, and also performs acceleration-deceleration according to the acceleration-deceleration data 19 to generate the position command 21. The generated position command 21 is sent to a servo amplifier 2 so as to drive a not-shown motor and operate a machine tool to thereby perform a desired machining. Incidentally, in this drawing, the numerical control device is configured in a range not containing the servo amplifier, but the device containing the servo amplifier may also be called the numerical control device.

FIG. 2 shows an example of the acceleration-deceleration data for each movement type. In this case, the movement type is a fixed cycle group. For example, a drill machining includes a fixed cycle of a type machining to the bottom of a hole with a single cutting and a fixed cycle of a type gradually machining to the bottom of a hole with a plurality of times of cutting. Each of both the fixed cycles is classified as a drill machining cycle. As shown in a table of FIG. 2, the post-interpolation acceleration-deceleration (constant inclination angle type) is selected as the acceleration-deceleration method, the linear type acceleration-deceleration is selected as the acceleration-deceleration pattern, 0.3 is selected as the inclination angle (tangential acceleration), and 0.02 is selected as the in-position width. The in-position width represents an allowable positioning error at the end point of movement. These acceleration-deceleration data is set by taking into consideration characteristics (maximum acceleration and so on) of axes used in the drill machining cycle, machining accuracy usually requested in the drill machining, and so on. The interpolation and acceleration-deceleration unit 16 performs acceleration-deceleration based on the selected acceleration-deceleration data. In the table of FIG. 2, during the drill machining cycle, not usual acceleration-deceleration data but acceleration-deceleration data of the drill machining cycle is selected. Thus, acceleration-deceleration is performed with an inclination angle larger than usual and hence an acceleration-deceleration time becomes short. Further, since acceleration-deceleration is performed with a large in-position width, a machining time can be made shorter than usual.

Incidentally, in FIG. 2, the post-interpolation acceleration-deceleration of constant inclination angle (acceleration) type is set as the acceleration-deceleration method during the drill machining cycle. This reason will be explained with reference to FIG. 3. FIG. 3 shows speed waveforms due to the difference in the acceleration-deceleration methods in a case of movements (N1, N2) of two blocks. The drill machining is supposed in the examples. N1 is a cutting feed from a hole inlet to a hole bottom and N2 is a high-speed return from the hole bottom to the hole inlet. As shown in FIG. 3(1), when the post-interpolation acceleration-deceleration of constant time-constant type is used, it is necessary to set the maximum time constant corresponding to the maximum feeding speed of the axis. Therefore, the movement N1 always requires a certain amount of acceleration-deceleration time irrespective of the feeding speed thereof, and so the moving time of N1 becomes long. When the pre-interpolation acceleration-deceleration of constant inclination angle type as shown in FIG. 3(2) is used, the acceleration-deceleration time of N1 is determined in proportional to the feeding speed (a proportional coefficient is the maximum time constant/the maximum feeding speed). Thus, at a usual machining speed (<maximum feeding speed), the acceleration-deceleration time becomes smaller than the maximum time constant. However, in the pre-interpolation acceleration-deceleration, the acceleration-deceleration is performed to a composite speed along a route, and thereafter an interpolation (distribution to respective axes) is performed. Thus, in a case where the direction changes at the end point of the block, the speed waveform of each of the axes becomes discontinuous (speed changes stepwise). As a result, if the speed is not reduced sufficiently at the end point of N1, vibration likely occurs due to the speed discontinuity. Accordingly, unlike the case of the post-interpolation acceleration-deceleration of constant time-constant type in FIG. 3(1), it is difficult to overlap the operations of N1 and N2. In contrast, in the post-interpolation acceleration-deceleration of constant inclination angle type of FIG. 3(3), as the inclination angle is constant, the acceleration-deceleration time is suppressed to be short. Further, as a movement and the next movement can be overlapped (speed waveform does not become discontinuous even when being overlapped), vibration can be suppressed. Thus, it is preferable to set the post-interpolation acceleration-deceleration of the constant inclination angle type as the acceleration-deceleration method of the drill machining cycle. By so doing, even in a case of an acceleration-deceleration mode which is usually usable in various kinds of machining in an all-around manner, a machining time can be shortened by using the post-interpolation acceleration-deceleration of the constant inclination angle type, in a machining cycle such as the drill machining in which there is a higher priority in the machining time.

Figure 4:
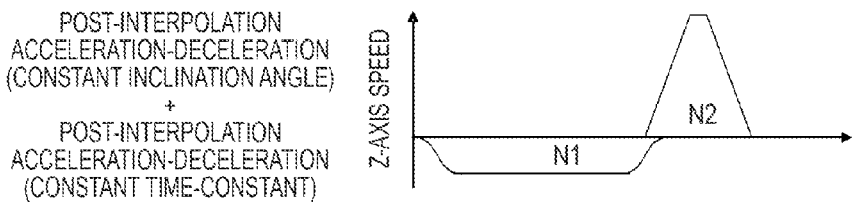
FIG. 4 is a diagram showing a speed waveform in a case of using in combination post-interpolation acceleration-deceleration of constant inclination angle type and post-interpolation acceleration-deceleration of constant time-constant type, according to the embodiment 1 of the invention.

However, in the case of using the post-interpolation acceleration-deceleration of the constant inclination angle type, although the machining time can be shortened, there arises a problem that mechanical vibration likely occurs. In view of this, as shown in FIG. 4, improvement is intended by using in combination the post-interpolation acceleration-deceleration of the constant time-constant type having a small time-constant (performing the post-interpolation acceleration-deceleration of the constant time-constant type having a smaller time-constant after performing the post-interpolation acceleration-deceleration of the constant inclination angle type), thereby smoothing the speed waveform. A time constant of the post-interpolation acceleration-deceleration of the constant time-constant type thus used in combination is set or controlled in a manner that a sum of time constants in the drill machining cycle (in the example of FIG. 2, a sum of the acceleration-deceleration time (feeding speed/inclination angle) of the post-interpolation acceleration-deceleration of the constant inclination angle type and the time constant of the post-interpolation acceleration-deceleration of the constant time-constant type) does not exceed a sum of usual time constants (in the example of FIG. 2, a sum of the acceleration-deceleration time (feeding speed/inclination angle) of the pre-interpolation acceleration-deceleration of the constant inclination angle type and the time constant of the pre-interpolation acceleration-deceleration of the constant time-constant type). By so doing, the machining time of the drill machining cycle having a higher priority in the machining time is made shorter than that of the usual case.

Figure 5:
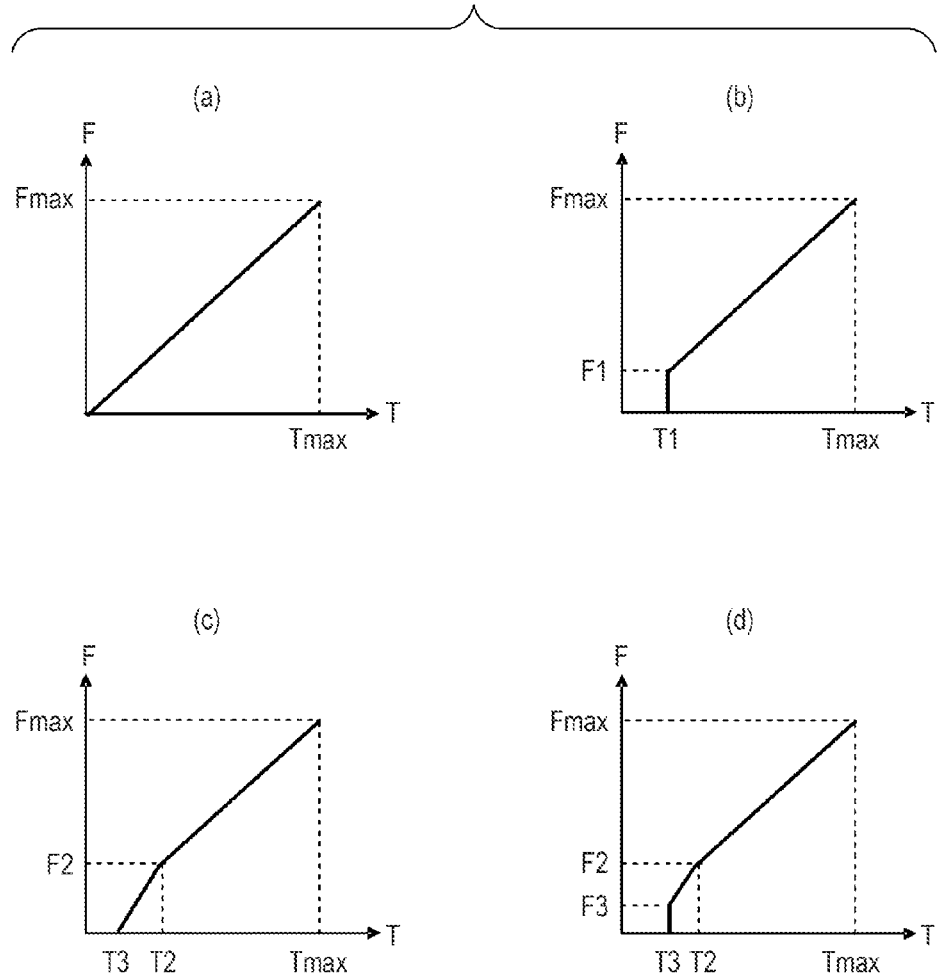
FIG. 5 shows graphs for explaining acceleration-deceleration times in acceleration-deceleration of constant inclination angle type, according to the embodiment 1 of the invention.

Alternatively, in the case of the acceleration-deceleration of the constant inclination angle type, as shown in FIG. 5(a), in general, the acceleration-deceleration time is proportional to the feeding speed (acceleration-deceleration time T=Tmax (maximum time constant)×F/Fmax (maximum feeding speed)). However, in a case where the acceleration-deceleration time T is not more than a reference value set in advance, the acceleration-deceleration time may be corrected so as to be larger than the acceleration-deceleration time T and not more than the reference value. For example, as shown in FIG. 5(b), in a case where T is not more than a reference value T1, T is corrected to T1 (that is, a minimum value (T1) of the acceleration-deceleration time is provided). Alternatively, as shown in FIG. 5(c), in a case where the acceleration-deceleration time T is smaller than a reference value T2 (in a case where a speed F is lower than F2), the acceleration-deceleration time may be reduced gradually as the speed reduces gradually from the acceleration-deceleration time T2 to the minimum acceleration-deceleration time (T3) (accordingly, the acceleration-deceleration time is corrected so as to be larger than T=Tmax×F/Fmax and not more than the reference value T2). Alternatively, as shown in FIGS. 5(d), (b) and (c) may be used in combination. By using the acceleration-deceleration time after correction, a value obtained by dividing the feeding speed by the acceleration-deceleration time after the correction is set as an inclination angle after correction. Then, the interpolation and acceleration-deceleration unit performs the acceleration-deceleration of the constant inclination angle type by using the inclination angle after correction. Each of the reference value of the acceleration-deceleration time, the minimum acceleration-deceleration time and a rate of gradually reducing the acceleration-deceleration time in a low speed region is adjusted in consideration of vibration characteristics of the machine. By so doing, although the constant-inclination angle acceleration-deceleration is used as a base, the acceleration-deceleration time can be prevented from being excessively short in a region where the speed is low, the acceleration-deceleration time becomes short and vibration likely occurs. Also in this case, by adjusting the minimum acceleration-deceleration time and the rate of gradually reducing the acceleration-deceleration time in the low speed region so as not to exceed the sum of usual time constants, the machining time can be made shorter as compared with the usual case.

In the above-described example, the acceleration-deceleration methods and the acceleration-deceleration parameters and so on in the methods are set in advance in the table shown in FIG. 2 prior to the machining. Alternatively, as another method, the numerical control device may automatically switch, without using the table, to a particular acceleration-deceleration method and a particular acceleration-deceleration parameter during a particular machining cycle. For example, as the drill machining cycle in most cases has a higher priority in the machining time, the post-interpolation acceleration-deceleration of the constant inclination angle type, by which the machining time becomes the shortest within the numerical control device, is selected. Further, according to this selection, taking into consideration the usual acceleration-deceleration time constant, the time constant of the post-interpolation acceleration-deceleration of the constant time-constant type to be used in combination may be automatically set within a range smaller than the usual acceleration-deceleration time constant. By so doing, it becomes not necessary to perform in advance a procedure of setting the acceleration-deceleration methods and the acceleration-deceleration parameters and so on for each machining cycle, and hence, time and effort can be reduced.

Further, preferably, a plurality of stages of acceleration-deceleration data (for example, multiple-stage selection ranging from accuracy priority to machining time priority) may be provided for each fixed cycle or fixed cycle group, and the data may be selected from the machining program or a screen. Alternatively, a tolerance may be designated from the machining program or the screen, and the acceleration-deceleration data corresponding to accuracy of the designated tolerance may be selected from a table or a relational expression of the plurality of stages of acceleration-deceleration data for each of the fixed cycle or fixed cycle group. Thus, the machining time can be shortened further within an accuracy range necessary for the machining.

As explained above, according to the embodiment 1, as the acceleration-deceleration is performed in accordance with the acceleration-deceleration data selected according to the movement type, shortening of the machining time and improvement of accuracy of a particular machining operation can be realized advantageously, without influencing on accuracy and so on of the usual machining.

Further, the acceleration-deceleration data is selected for the each fixed cycle or fixed cycle group, and the acceleration-deceleration is performed according to this acceleration-deceleration data. Thus, in particular, shortening of the machining time and improvement of the accuracy of a particular machining operation instructed by the fixed cycle can be realized advantageously, without influencing on accuracy and so on of the usual machining.

Further, even in a case where the usual acceleration-deceleration method is the pre-interpolation acceleration-deceleration or the post-interpolation acceleration-deceleration of the constant time-constant type, when the movement type is a particular fixed cycle or fixed cycle group, the acceleration-deceleration data in which the acceleration-deceleration method is the post-interpolation acceleration-deceleration of the constant inclination angle type is selected. By so doing, the machining time can be shortened advantageously.

Further, at the time of selecting the post-interpolation acceleration-deceleration of the constant inclination angle type, the post-interpolation acceleration-deceleration of constant time-constant type is used in combination. Thus, a more smooth command can be generated, and the generation of mechanical vibration and degradation of accuracy can be suppressed, advantageously.

Further, even in a case of using in combination the post-interpolation acceleration-deceleration of the constant inclination angle type and the post-interpolation acceleration-deceleration of the constant time-constant type, the sum of the acceleration-deceleration time of the post-interpolation acceleration-deceleration of the constant inclination angle type, which is determined by dividing a command speed by an inclination angle, and the time constant of the post-interpolation acceleration-deceleration of the constant time-constant type used in combination is set to be shorter than the acceleration-deceleration time of the pre-interpolation acceleration-deceleration or the post-interpolation acceleration-deceleration of the constant time-constant type which is selected usually. Thus, the machining time can be reliably shortened while suppressing the generation of the mechanical vibration and the degradation of accuracy, advantageously.

Further, in a case of selecting the post-interpolation acceleration-deceleration of the constant inclination angle type, a minimum value of the time constant is provided or a time constant larger than a time constant determined by dividing a feeding speed by an inclination angle is used. By so doing, the generation of mechanical vibration and degradation of accuracy can be suppressed, advantageously.

Further, in a case of selecting the post-interpolation acceleration-deceleration of the constant inclination angle type, if the minimum value of the time constant is provided or a time constant larger than a time constant determined by dividing a feeding speed by an inclination angle is used, a time constant of the acceleration-deceleration of the constant inclination angle type is selected so as to be shorter than the usual time constant. As a result, the machining time can be reliably shortened while suppressing the generation of mechanical vibration and the degradation of accuracy, advantageously.

Embodiment 2

In the embodiment 1, the description is made as to the example where the acceleration-deceleration method and the acceleration-deceleration parameters and so on are selected for each fixed cycle or fixed cycle group. The embodiment 2 shows an example where the movement type is further subdivided for each movement within the fixed cycle.

Figure 6:
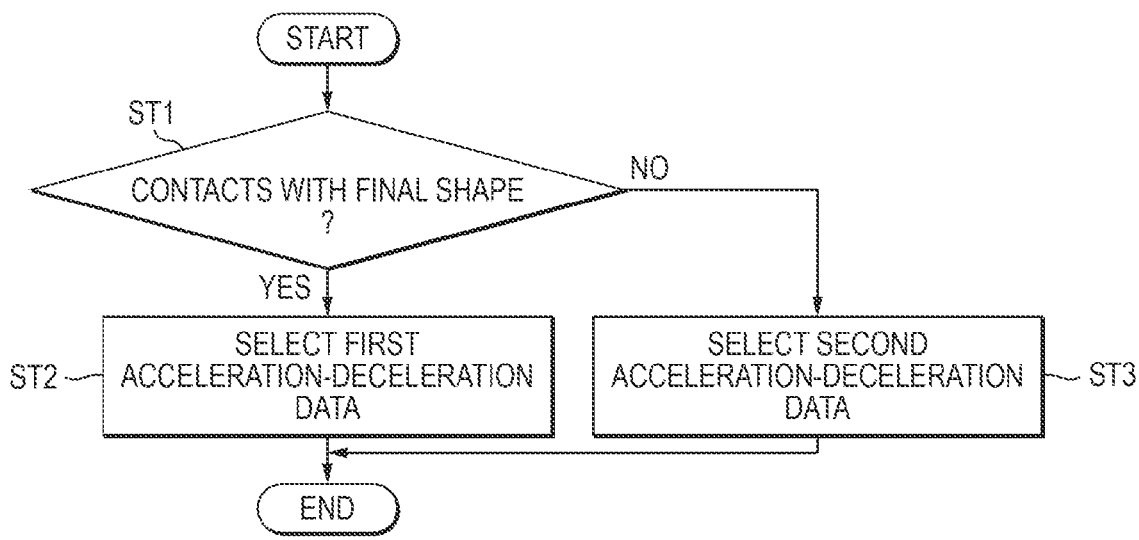
FIG. 6 is a flowchart showing an operation of an acceleration-deceleration data selection unit according to an embodiment 2 of the invention.

FIG. 6 is a flowchart showing an operation of the acceleration-deceleration data selection unit. In ST1, it is determined whether or not each movement contacts a final shape (final machining shape). The final shape represents a machining shape finally generated in a case of finishing the fixed cycle. For example, in a case of a hole machining cycle using a step feeding where the machining is performed by a plurality of times of cutting feed, it is determined that the cutting feed on the way to a hole does not contact the final shape. In contrast, it is determined that the final cutting feed to the bottom of the hole contacts the final shape. In the fixed cycle, whether or not each of the movement routes contacts the final shape can be determined depending on which block (movement) it is within the fixed cycle data (macro). In the case of a hole machining, a movement to the bottom of a hole is a movement contacting a final shape, whilst a cutting feed other than this movement is a movement not contacting the final shape. In a case of YES in ST1 (case of contacting the final shape), the first acceleration-deceleration data is selected. In a case of NO in ST1 (case of not contacting the final shape), the second acceleration-deceleration data is selected. The second acceleration-deceleration data is data for shortening the machining time than that of the first acceleration-deceleration data.

Figure 7:
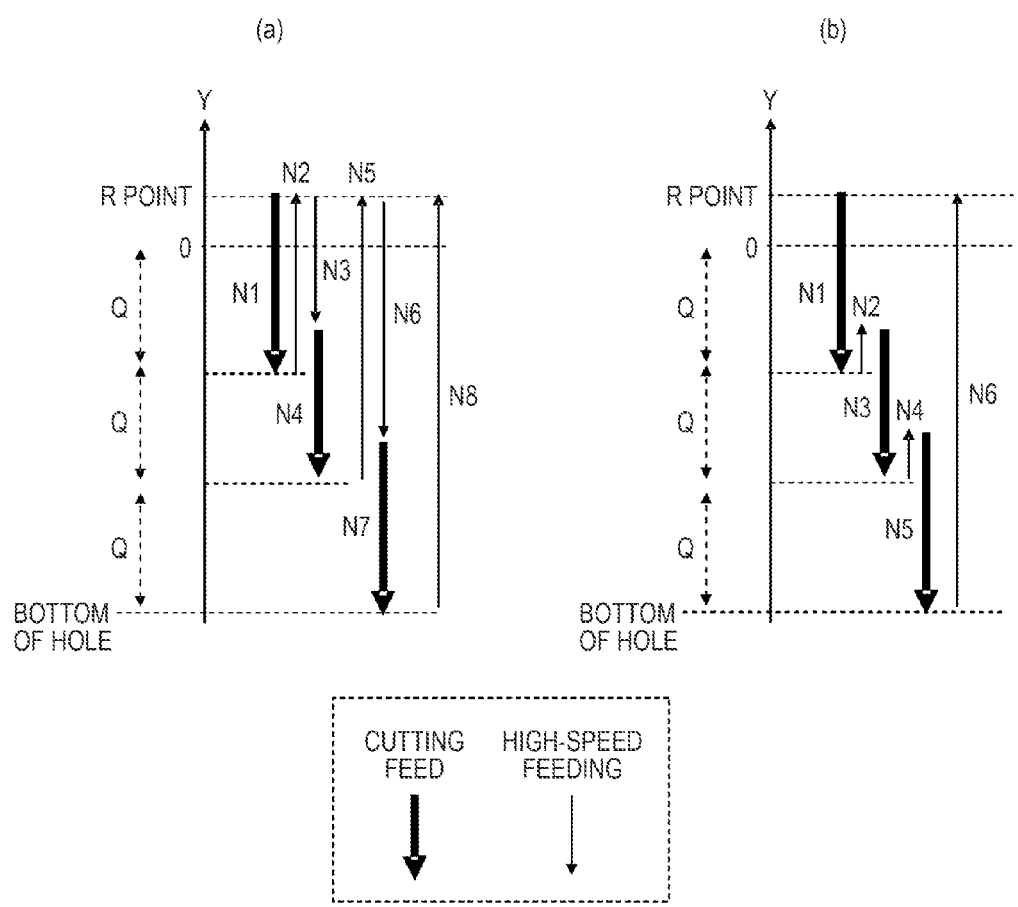
FIG. 7 is a diagram showing examples of an operation of a hole machining cycle using a step feeding, according to the embodiment 2 of the invention.

FIG. 7 is examples of the operation of the hole machining cycle using the step feeding. FIG. 7(a) shows a movement command of a deep hole machining cycle and FIG. 7(b) shows a movement command of a high-speed deep hole machining cycle. In a case of (a), the machining to the bottom of the hole is performed by dividing it into three times, by a depth Q each time. Although, the machining is performed by three cutting feed movements of N1, N4 and N7, only the movement N7 directly influences on accuracy of the final machining shape. Thus, an allowable error value (in-position width) at the end point of N7 is set so that accuracy at the end point of the movement N7 relating to the final machining shape satisfies required accuracy. On the other hand, as accuracy at the end point of each of N1 and N4 does not influence on the final machining shape, a value lager than the in-position width at the end point of N7 is set so as to shorten the machining time. Similarly, also in FIG. 7(b), as accuracy of the machining of the final stage (N5) is most important, allowable error of each of N1 and N3 is set to a large value in order to shorten the machining time.

Figure 8:
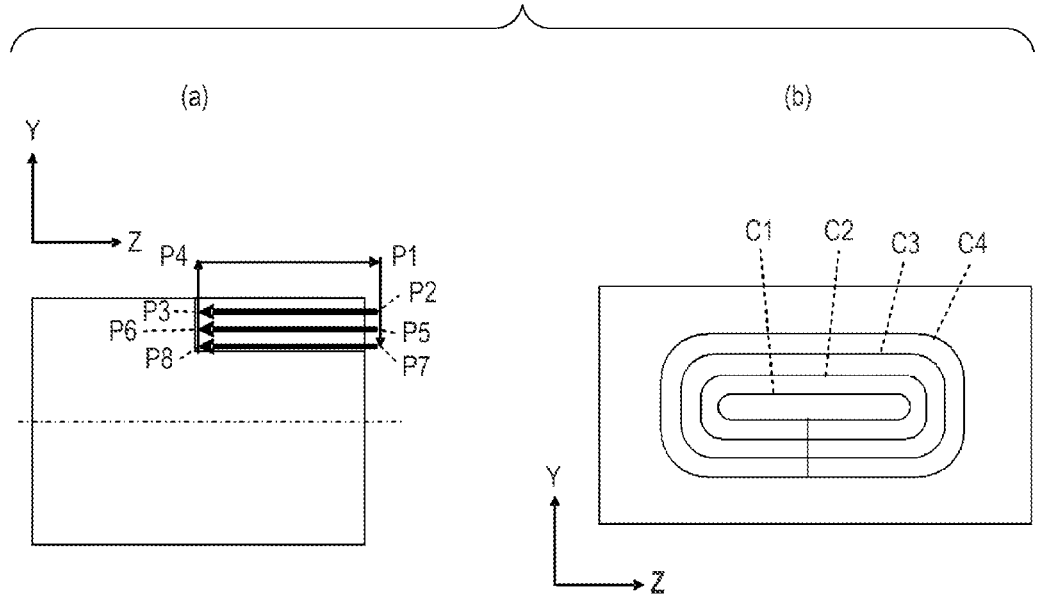
FIG. 8 is a plan view showing movement routes of a turning machining and a mill machining, according to the embodiment 2 of the invention.

In addition to the drill machining, for example, also in each of a turning machining (drawing shows an example of an outer diameter machining) as shown in FIG. 8(a) and a mill machining (drawing shows an example of a pocket machining) as shown in FIG. 8(b), since a movement (tool route) contacting a final machining shape directly influences on machining accuracy, it is necessary to use acceleration-deceleration data capable of achieving required accuracy. Meanwhile, for the other movements, acceleration-deceleration data capable of shortening a machining time is selected. For example, in a case of a turning machining cycle where the machining is performed by a plurality of times of cutting feed as shown in FIG. 8(a), the machining is performed by dividing it into three times of the cutting feed of P2-P3, P5-P6 and P7-P8. Only the movement of the cutting feed of P7-P8 directly influences on accuracy of the final machining shape. Thus, an allowable error value (in-position width) of P7-P8 is set so that machining accuracy of the movement using the cutting feed of P7-P8 relating to the final machining shape satisfies required accuracy. On the other hand, as machining accuracy of the movement using each of the cutting feed of P2-P3 and P5-P6 does not influence on the final machining shape, a value lager than the in-position width at the cutting feed of P7-P8 is set so as to shorten the machining time. Also, in a case of a mill machining cycle where the machining is performed by a plurality of times of cutting feed as shown in FIG. 8(b), the machining is performed by dividing it into four times of the cutting feed of C1, C2, C3 and C4. Only the movement of the cutting feed of C4 directly influences on accuracy of the final machining shape. Thus, an allowable error value (in-position width) of C4 is set so that machining accuracy of the movement by the cutting feed of C4 relating to the final machining shape satisfies required accuracy. On the other hand, as machining accuracy of the movement by each of the cutting feed of C1, C2 and C3 does not influence on the final machining shape, a value lager than the in-position width at the cutting feed of C4 is set so as to shorten the machining time.

However, for example, if the in-position width of N4 in FIG. 7(a) is excessive, a tool does not reach the end point of N4. As a result, a machining amount at the end point of the final stage N7 becomes larger than the predetermined value (Q). In general, at the bottom of a hole, chips likely clog and hence a machining load likely increases. If the machining amount near the bottom of the hole becomes too large, there arises a problem such as an overload, bending of the tool and breakage of the tool. Such problem must be avoided. In particular, if the tool bends due to the overload, the machining accuracy is badly influenced. Thus, in order to perform the machining stably and with high accuracy without causing the overload at the machining of the final stage (N7), it is necessary not to cause the overload or the degradation of accuracy at the machining of a preceding stage, to thereby suppress a fluctuation of the machining amount (a cutting amount, a machining depth at each step in a case of the hole machining) Similarly, also in FIG. 7(b), the accuracy of the machining of the final stage (N5) is most important. Thus, the allowable error of each of N1 and N3 is made large to some extent in order to shorten the machining time. Meanwhile, taking into consideration the keeping of stability and accuracy of the machining, the accuracy of N3 is required to have a certain degree for N5 and also the accuracy of N1 is required to have a certain degree for N3. This is the same also in the cases of other turning machining and mill machining. An allowable error with respect to a movement not generating a final machining shape may be automatically determined in conjunction with a machining amount in a view point of not causing a fluctuation of the machining amount (a cutting amount, a machining depth at each step in a case of the hole machining). For example, in a case of the hole machining, the allowable error can be easily set by making a value obtained by multiplying the machining depth (Q) at each step by a predetermined power (5%, for example) to be the allowable error.

Figure 9:
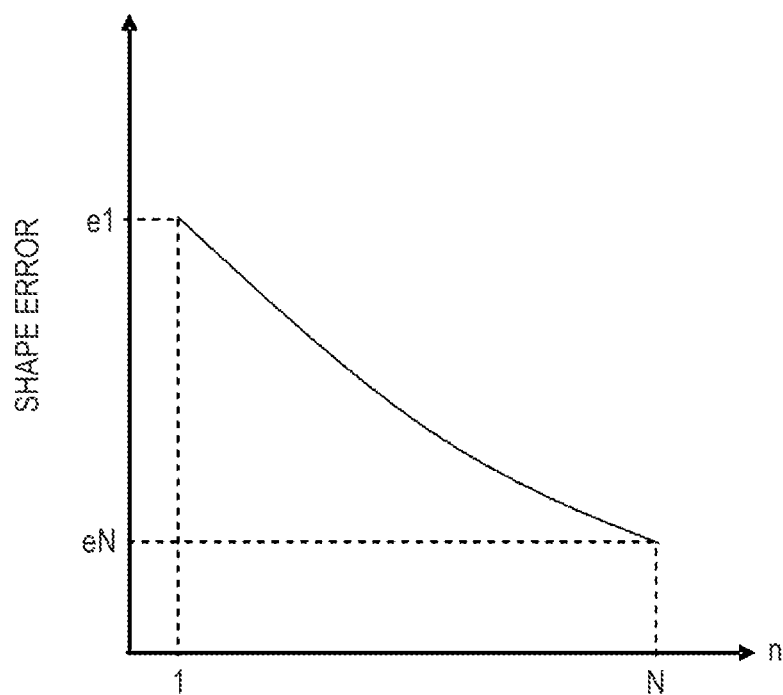
FIG. 9 is a graph showing selection of a shape error for each movement, according to the embodiment 2 of the invention.

Further preferably, as shown in FIG. 9, in a case of performing a machining by a plurality of times of cutting feed in a manner of gradually approaching a final machining shape by N times of machining, acceleration-deceleration data is selected so as to obtain a gradually reducing type of error in which a shape error reduces gradually as the shape approaches the final machining shape. Specifically, the selection is made in a manner that an in-position width of the cutting feed in the middle gradually approaches an in-position width of the final cutting feed. Accordingly, the operation is performed in a manner that a machining time becomes shorter at a portion more distanced from the final machining shape, while keeping stability and accuracy of the machining. As a result, the machining time can be shortened.

According to the embodiment 2, in a case of performing a machining according to the fixed cycle where a machining is performed gradually by a plurality of times of cutting feed operations, acceleration-deceleration data is selected in a manner that accuracy of a movement relating to generation of a final machining shape is higher than accuracy of a movement not relating to generation of the final machining shape. Thus, a machining time can be shortened advantageously while keeping accuracy of the final machining shape.

Further, acceleration-deceleration data is selected in a manner that shape error reduces gradually as the shape approaches a final machining shape. Thus, a machining time can be shortened advantageously while keeping stability and accuracy of the machining.

INDUSTRIAL APPLICABILITY

The numerical control device according to the invention is suitable for performing the acceleration-deceleration control so as to realize the shortening of a machining time and

DESCRIPTION OF REFERENCE NUMERALS 1 numerical control device
2 servo amplifier
11 machining program
12 command
13 analyzing unit
14 fixed cycle data
15 movement data
16 interpolation and acceleration-deceleration unit
17 movement type
18 acceleration-deceleration data selection unit
19 acceleration-deceleration data
20 acceleration-deceleration data for respective movement-types
21 position command

The invention claimed is:

1. A numerical control device which controls positions of respective axes of a machine tool according to a machining program, the numerical control device comprising:
an analyzing unit which obtains movement data and a movement type by analyzing a command instructed to the machining program;
an acceleration-deceleration data selection unit which selects specific acceleration-deceleration data according to the movement type from acceleration-deceleration data in which acceleration-deceleration methods are set in advance for each movement type of a usual mode and each fixed cycle or each fixed cycle group; and
an interpolation and acceleration-deceleration unit which generates a position command by performing interpolation on a movement route, which is instructed to the movement data, according to a command speed and performing acceleration-deceleration according to the acceleration-deceleration data,
characterized in that
in a case where the movement type is the particular fixed cycle or fixed cycle group, the acceleration-deceleration data selection unit selects the acceleration-deceleration data, in which the acceleration-deceleration method is the post-interpolation acceleration-deceleration of the constant inclination angle type, and also selects acceleration-deceleration data, in which the acceleration-deceleration method is post-interpolation acceleration-deceleration of a constant time-constant type, and further, in a case of selecting the acceleration-deceleration data, in which the acceleration-deceleration method is the post-interpolation acceleration-deceleration of the constant time-constant type, the acceleration-deceleration data selection unit selects the acceleration-deceleration data, in which the acceleration-deceleration method is the post-interpolation acceleration-deceleration of the constant time-constant type, so that a sum of an acceleration-deceleration time, which is determined by dividing a feeding speed by an inclination angle set in the acceleration-deceleration data in which the acceleration-deceleration method is the post-interpolation acceleration-deceleration of the constant inclination angle type, and a time constant, which is set in the acceleration-deceleration data in which the acceleration-deceleration method is the post-interpolation acceleration-deceleration of the constant time-constant type, is smaller than a sum of an acceleration-deceleration time, which is determined by dividing a feeding speed by an inclination angle set in acceleration-deceleration data selected in a case where the movement type is the usual mode, and a time constant of the post-interpolation acceleration-deceleration of the constant time-constant type, which is set in the acceleration-deceleration data selected in a case where the movement type is the usual mode, and
the interpolation and acceleration-deceleration unit performs the acceleration-deceleration according to the acceleration-deceleration data, in which the acceleration-deceleration method is the post-interpolation acceleration-deceleration of the constant inclination angle type, and also performs the acceleration-deceleration according to the acceleration-deceleration data, in which the acceleration-deceleration method is the post-interpolation acceleration-deceleration of the constant time-constant type.

2. A numerical control device which controls positions of respective axes of a machine tool according to a machining program, the numerical control device comprising:
an analyzing unit which obtains movement data and a movement type by analyzing a command instructed to the machining program;
an acceleration-deceleration data selection unit which selects specific acceleration-deceleration data according to the movement type from acceleration-deceleration data in which acceleration-deceleration methods are set in advance for each movement type of a usual mode and each fixed cycle or each fixed cycle group; and
an interpolation and acceleration-deceleration unit which generates a position command by performing interpolation on a movement route, which is instructed to the movement data, according to a command speed and performing acceleration-deceleration according to the acceleration-deceleration data,
characterized in that
in a case where the movement type is the particular fixed cycle or fixed cycle group, the acceleration-deceleration data selection unit selects the acceleration-deceleration data in which the acceleration-deceleration method is the post-interpolation acceleration-deceleration of the constant inclination angle type, if an acceleration-deceleration time, which is determined by dividing a feeding speed by an inclination angle set in the acceleration-deceleration data in which the acceleration-deceleration method is the post-interpolation acceleration-deceleration of the constant inclination angle type, is not longer than a reference value set in advance, corrects the acceleration-deceleration time so as to be longer than the acceleration-deceleration time and not longer than the reference value, and obtains an inclination angle after correction by dividing the feeding speed by the corrected acceleration-deceleration time, and
the interpolation and acceleration-deceleration unit performs the acceleration-deceleration by using the inclination angle after correction.

3. The numerical control device according to claim 2, characterized in that
in a case where the movement type is the particular fixed cycle or fixed cycle group, at a time of selecting the acceleration-deceleration data, in which the acceleration-deceleration method is the post-interpolation acceleration-deceleration of the constant inclination angle type, the acceleration-deceleration data selection unit selects the acceleration-deceleration data, in which the acceleration-deceleration method is the post-interpolation acceleration-deceleration of the constant inclination angle type, such that the acceleration-deceleration time, which is determined by dividing the feeding speed by the inclination angle set in the acceleration-deceleration data in which the acceleration-deceleration method is the post-interpolation acceleration-deceleration of the constant inclination angle type, is shorter than a sum of an acceleration-deceleration time, which is determined by dividing a feeding speed by an inclination angle set in the acceleration-deceleration data selected in a case where the movement type is the usual mode, and a time constant of the post-interpolation acceleration-deceleration of the constant time-constant type, which is set in the acceleration-deceleration data selected in a case where the movement type is the usual mode.

\* \* \* \* \*